United States Patent

Norbury, Jr.

[11] Patent Number: 6,158,978
[45] Date of Patent: Dec. 12, 2000

[54] BLOWER HOUSING MOTOR MOUNT ADAPTER AND GASKETS

[75] Inventor: Raymond L. Norbury, Jr., Dallas, Tex.

[73] Assignee: Cary Products Co., Inc., Hutchins, Tex.

[21] Appl. No.: 09/140,232

[22] Filed: Aug. 26, 1998

[51] Int. Cl.[7] .................................................... F04B 17/00
[52] U.S. Cl. ...................... 417/350; 417/423.14; 248/638
[58] Field of Search .............................. 417/350, 423.14, 417/423.15; 248/638, 664, 672

[56] References Cited

U.S. PATENT DOCUMENTS

| | | | |
|---|---|---|---|
| 4,171,190 | 10/1979 | Hudson | 417/350 |
| 5,391,063 | 2/1995 | Hantle et al. | 417/423.7 |
| 5,397,950 | 3/1995 | Norbury et al. | 310/91 |
| 5,403,163 | 4/1995 | Murphy | 417/350 |

Primary Examiner—Henry C. Yuen
Assistant Examiner—Mahmoud M Gimie
Attorney, Agent, or Firm—David W. Quimby

[57] ABSTRACT

A motor mount adapter is disclosed which allows a blower housing to firmly hold a blower motor having a different size and shape than the blower motor originally designed to fit on the motor mounts and gaskets of the blower housing. The motor mount adapter has an outside surface which is shaped to mate with the surface of the motor mounts of the blower housing. If the motor mount surface has positioning holes, the outside surface of the motor mount adapter has projections which fit within the positioning holes to hold the motor mount firmly in place. The inside surface of the motor mount adapter holds gaskets which separate the blower motor from the motor mount adapter. When assembled, the blower motor of the blower assembly is supported solely by the gaskets on the motor mount adapter.

18 Claims, 6 Drawing Sheets

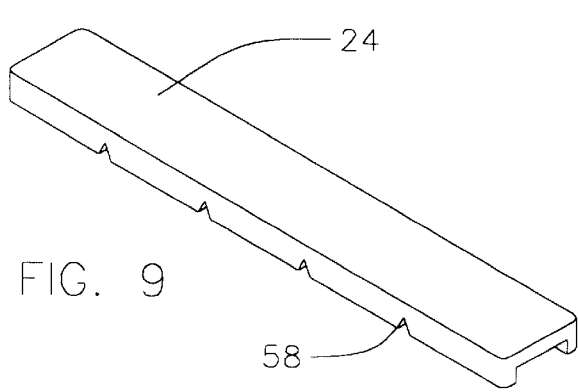
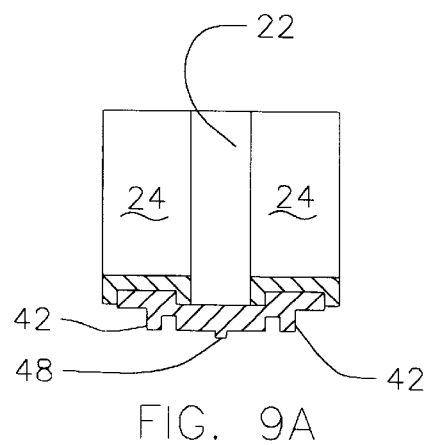
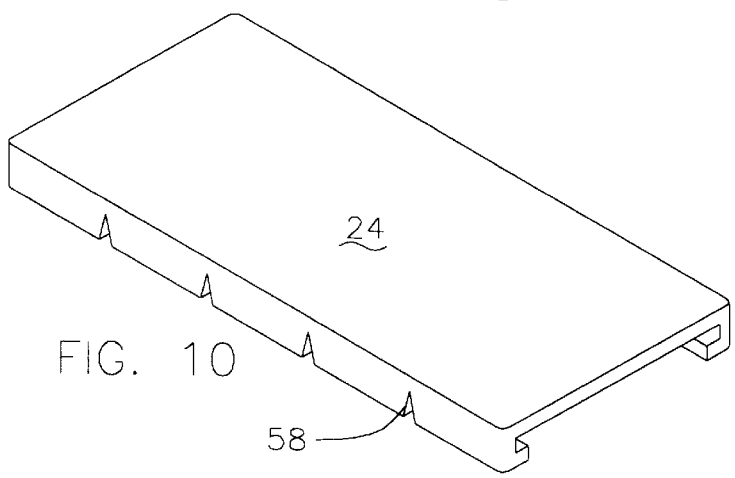
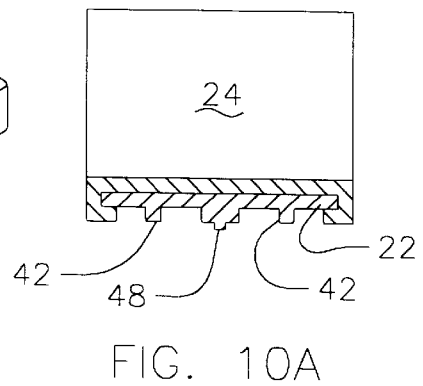
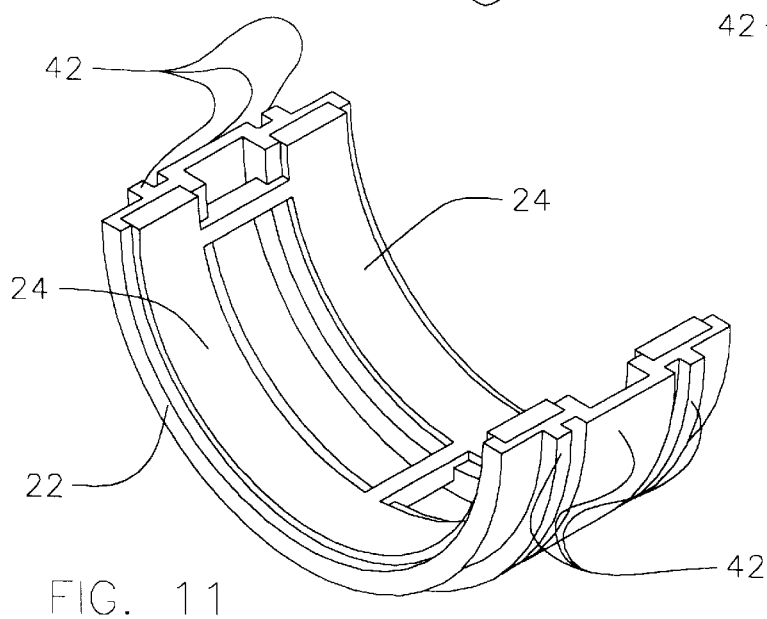

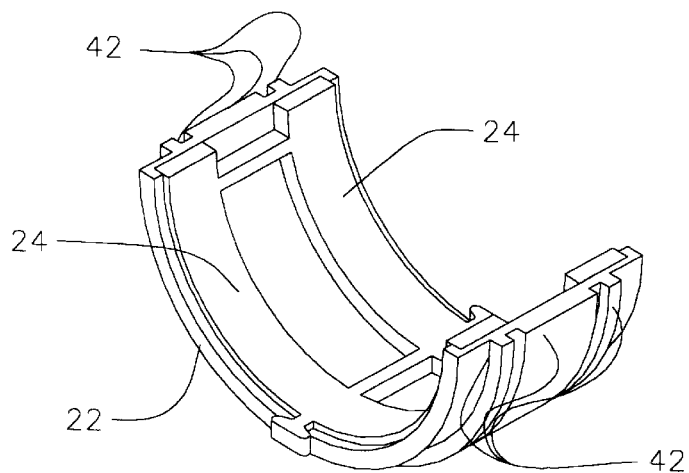
FIG. 12
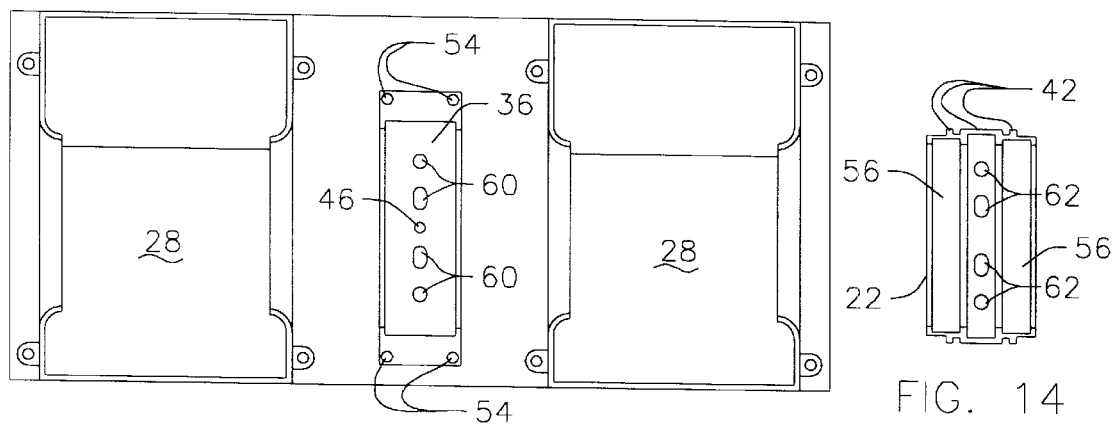
FIG. 13
FIG. 14

BLOWER HOUSING MOTOR MOUNT ADAPTER AND GASKETS

BACKGROUND OF THE INVENTION (1) Field of the Invention

This invention relates to blower housing motor mounts and gaskets, and more particularly to an adapter and gaskets for the motor mounts of a blower housing which allows the blower housing to hold various motor shapes and sizes firmly in the blower housing motor mounts.

(2) Description of Related Art

A blower housing assembly comprises a blower motor, a blower wheel (or blower wheels), and a blower housing. The blower housing has a blower wheel cover (or blower wheel covers), and a motor mount. The motor mount is designed to hold a blower motor of a specific size. U.S. Pat. No. 5,397,950, issued to Norbury, Jr. et al, and U.S. Pat. No. 5,403,163, issued to Murphy, show two piece blower housings having motor mounts.

U.S. Pat. No. 5,397,950, issued to Norbury, Jr. et al, describes a blower housing wherein each motor mount has a gasket recess and a gasket positioning hole. When the blower housing is assembled, the blower motor is held securely in place against gaskets positioned in recesses on the motor mounts of the housing members. If the motor mounts have gasket positioning holes, the gaskets used to hold the motor in place have projections which fit within the positioning holes of the motor mounts to securely hold the gasket against the blower housing. Also, the motor mounts and the gaskets which fit onto the motor mounts can have ventilation slots.

When the blower motor of a blower housing assembly is initially turned on, the initial torque in the blower motor tries to rotate the blower motor. Friction between the gaskets and the blower motor prevents blower motor rotation. Gasket positioning holes in the motor mounts, along with gaskets which have projections which fit into the gasket positioning holes, eliminate the possibility of blower motor rotation in a blower assembly upon startup of the blower motor. Also, rotation of the blower motor is prevented by bumps, ribs, or other surface features on the surface of the gasket which resides against the blower motor.

SUMMARY OF THE INVENTION (1) Progressive Contribution to the Art

A motor mount adapter assembly allows differently sized and shaped motors to be utilized on a blower housing. Due to cost or engineering changes, it is sometimes necessary to use a different blower motor with a blower housing. Previously, a change in the size of the blower motor necessitated a redesign of the entire blower housing so that the blower housing would hold the new blower motor firmly in place.

The motor mount adapter assembly comprises an upper adapter member, a lower adapter member, and a gasket or gaskets. The upper and lower adapter members fit onto the motor mounts of the blower housing. In a preferred embodiment of the invention, the upper and lower adapter members are held in place by the edges of the recesses of the blower housing motor mounts. If the blower housing motor mounts have positioning holes, then the upper and lower adapter members have projections which mate with the positioning holes to securely hold the motor mount adapter assembly in place against the motor mounts.

(2) Objects of this Invention

An object of this invention is to provide a motor mount adapter for a two piece blower housing which uses an isolation gasket or gaskets to hold an electric motor between a top blower housing motor mount and a bottom blower housing motor mount of the blower housing.

Another object is to provide a motor mount adapter for a blower housing which accommodates a blower motor with a different dimensional size than what the original blower housing was designed to hold. The blower motor held by the motor mount adapter may be longer or shorter in length, and/or smaller in diameter, than the original blower motor which the blower housing motor mounts of the blower housing were designed to hold.

Another object is to provide a motor mount adapter for a blower housing which includes an isolation gasket or gaskets to prevent any part of the adapter motor mount from contacting the motor casing of the blower motor when the blower housing is assembled. The motor casing of the blower motor contacts only the gaskets on the motor mount adapter.

Another object is to eliminate the need and cost of redesigning, retooling, and building new top and bottom blower housing members to accommodate variously sized and shaped blower motors.

Further objects are to achieve the above with a device which is sturdy, compact, durable, light-weight, simple, safe, efficient, versatile, ecologically compatible, energy conserving, reliable, and easy to manufacture.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 9 is a perspective view of a gasket having a channel form.

FIG. 9A is an end elevation section view of a motor mount adapter which uses the type of gasket shown in FIG. 9.

FIG. 10 is a perspective view of a wide gasket having a channel form with undercut lips to fit over and under the edges of a motor mount adapter without the need of a recess or holding slots in the motor mount adapter.

FIG. 10A is an end elevation section view of a motor mount adapter which uses the type of gasket shown in FIG. 10.

FIG. 11 is a perspective view of a motor mount adapter and gasket.

FIG. 12 is a perspective view of a motor mount adapter and gasket wherein the gasket has side projections.

FIG. 13 is a top elevational view of a bottom blower housing member which has ventilation slots in the motor mount.

FIG. 14 is a top elevational view of a motor mount adapter which has ventilation slots in the motor mount adapter.

Figure 1:
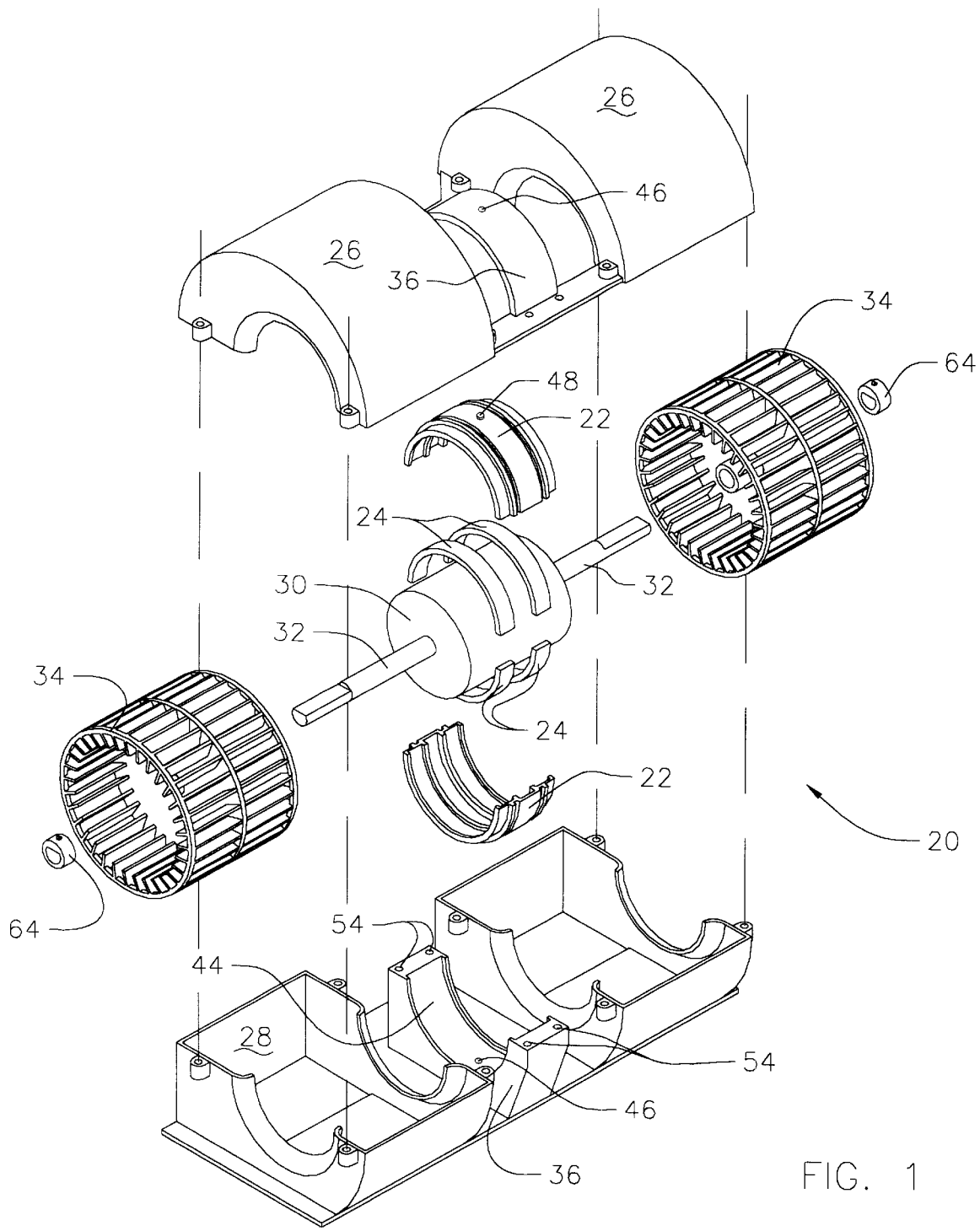
FIG. 1 is an exploded view of a blower housing assembly.

As an aid to correlating the terms of the claims to the exemplary drawings the following catalogue of elements is provided:

20 blower assembly
22 motor mount adapter
24 gasket
26 top housing member
28 bottom housing member
30 blower motor
32 shaft
34 blower wheel
36 motor mount
38 outside surface
40 inside surface
42 raised portion
44 recess
46 positioning hole
48 projection
50 tab
52 adapter hole
54 motor mount hole
56 gasket mounting surface
58 notch
60 motor mount ventilation slot
62 motor mount adapter ventilation slot
64 clip

DESCRIPTION OF THE PREFERRED EMBODIMENTS

With reference to the drawings, FIG. 1 shows an exploded view of a blower assembly 20 with motor mount adapters 22 and adapter gaskets 24. The blower assembly 20 comprises top housing member 26, bottom housing member 28, blower motor 30, shafts 32, and blower wheels 34. Each housing member 26, and 28 has a motor mount 36. The motor mount adapter 22 and the adapter gaskets 24 allow a blower motor 30 to be used in the blower assembly 20 wherein the blower motor has a different geometry than the original blower motor that the motor mounts 36 were designed to hold. The blower motor 30 held by the motor mount adapter 22 may be longer or shorter in length, and/or smaller in diameter, than the original blower motor which the blower housing motor mounts 36 were designed to hold.

Figures 2, 3:
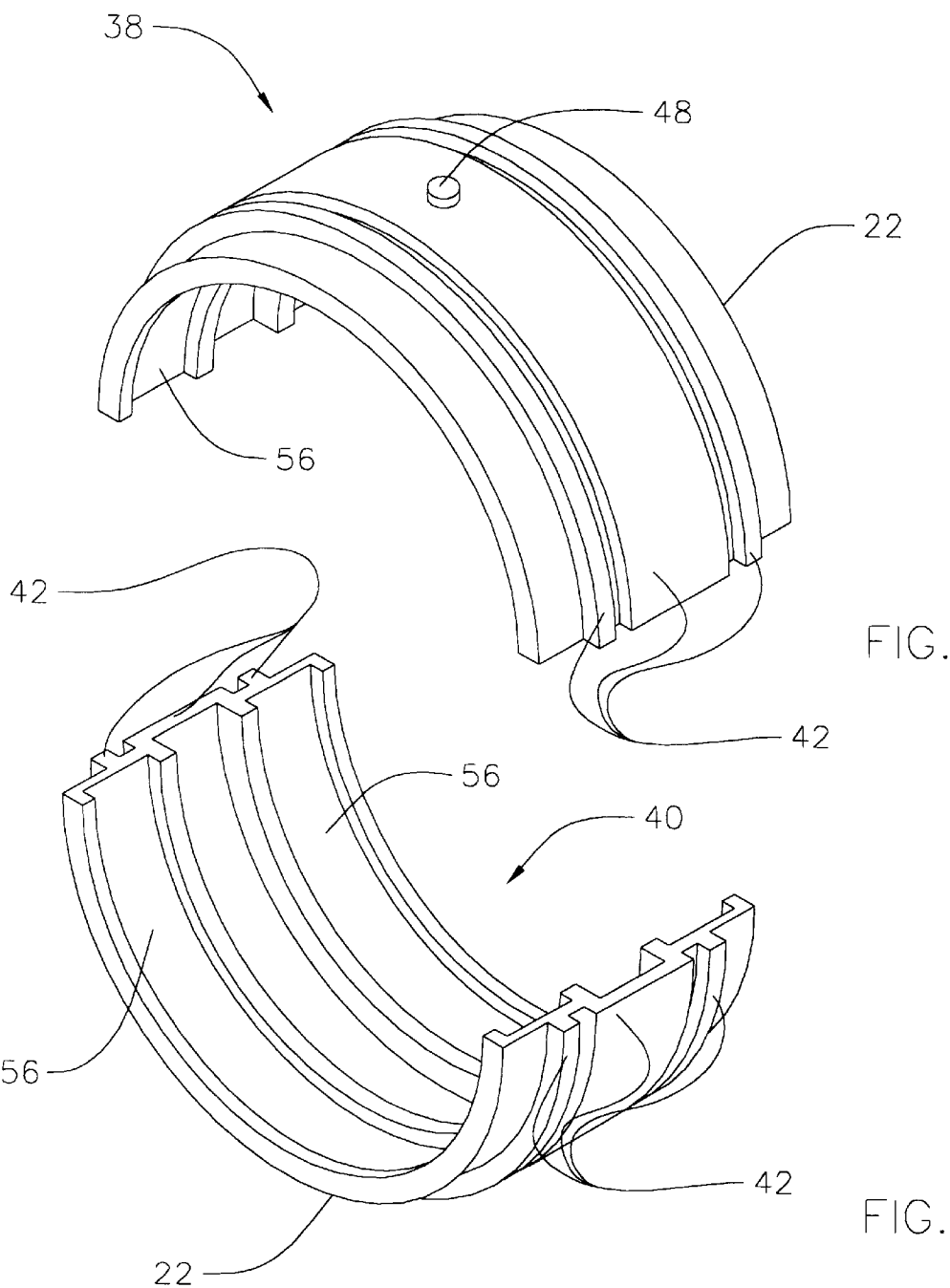
FIG. 2 is a perspective view of a first embodiment of a motor mount adapter showing the outside surface of the motor mount adapter.
FIG. 3 is a perspective view of the first embodiment of the motor mount adapter showing the inside surface of the motor mount adapter.
Figure 4:
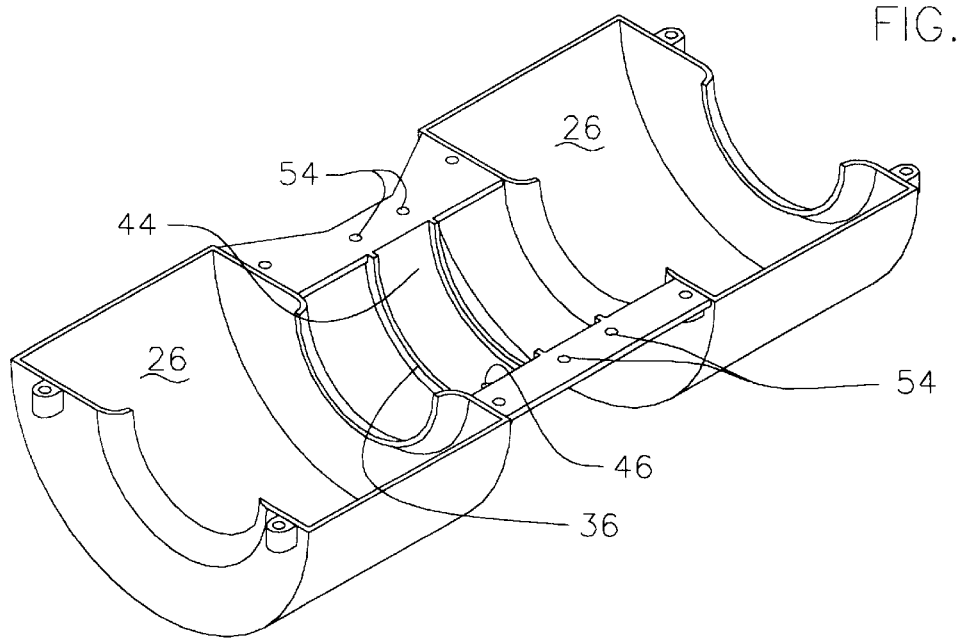
FIG. 4 is a perspective view of a top housing member of a blower housing assembly.

As shown in FIGS. 2 and 3, the motor mount adapter 22 has outside surface 38 and inside surface 40. The motor mount adapter 22 is made of a rigid material; preferably a rigid plastic material. The outside surface 38 of the motor mount adapter 22 has raised portion 42. The raised portion 42 is shaped to mate with the surface of the motor mount 36 of a housing member 26 or 28. FIG. 1 shows the inside surface of the bottom housing member 28, including motor mount 36; and FIG. 4 shows the inside surface of the top housing member 26, including motor mount 36. The motor mounts 36 have recesses 44 and positioning holes 46. In a blower housing assembly 20 which does not use a motor mount adapter 22, the recess 44 held a gasket (not shown). When a motor mount adapter 22 is used to form the blower housing assembly 20, the raised portion 42 on the outside surface 38 of the motor mount adapter fits within the recess 44 of the motor mount 36.

The outside surface 38 of the motor mount adapter 22 can have projection 48. The projection 48 fits into the positioning hole 46 on the motor mount 36 to securely hold motor mount adapter 22 against the motor mount. The projection 48 prevents movement of the motor mount adapter 22 due to torque when the blower motor 30 is started. Alternatively, the motor mount 36 could have a positioning projection, and the motor mount adapter 22 could have a positioning hole which mates with the positioning projection of the motor mount (not shown).

Figure 5:
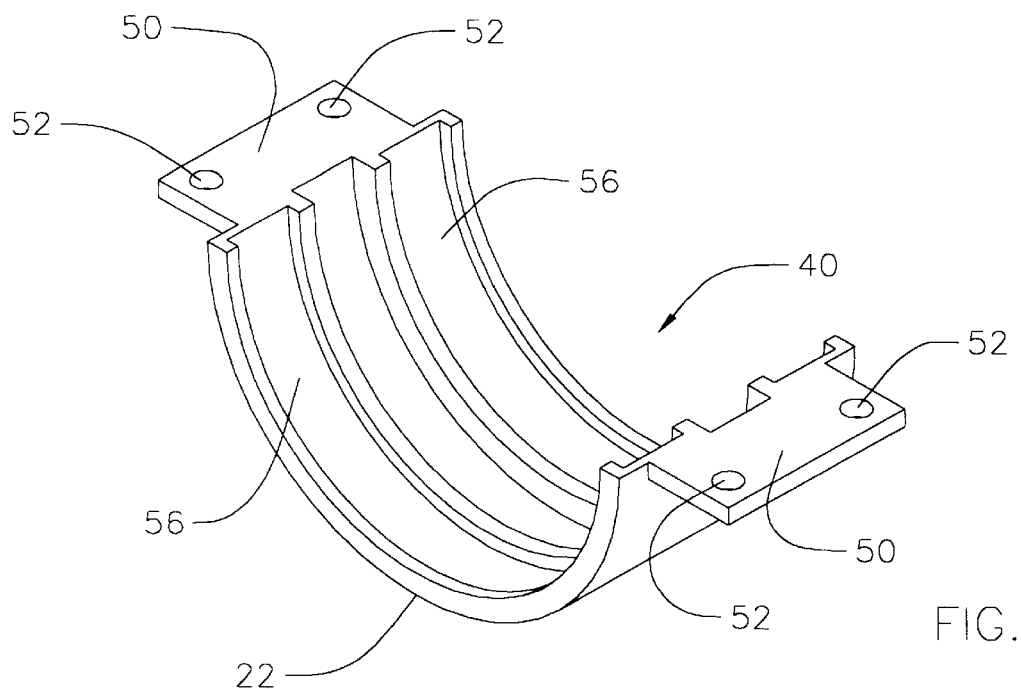
FIG. 5 is a perspective view of an alternate embodiment of a motor mount adapter.

FIG. 5 shows an alternate embodiment of a motor mount adapter 22. The motor mount adapter 22 is formed with tabs 50. The tabs 50 have holes 52 which correspond to holes 54 in the motor mounts 36 of the housing members 26, 28. Motor mount holes 54 in the housing members 26, 28 are shown in FIGS. 1 and 4. When the blower assembly 20 is assembled, the motor mount adapter 22 is held in place by screws (not shown) placed through the motor mount holes 54 and the tab holes 52. Because the motor mount adapters 22 are held in place by screws when the blower housing assembly 20 is assembled, recesses 44 in the motor mounts 36 and raised portions 42 on the motor mount adapter 22 are not required.

The inside surface 40 of the motor mount adapter 22 has gasket mounting surfaces 56. FIG. 3 shows a preferred embodiment of the gasket mounting surfaces 56, wherein the gasket mounting surfaces are recesses in the body of the motor mount adapter 22. The motor mount adapter 22 can be formed so that there is only one recess (not shown).

Figure 6:
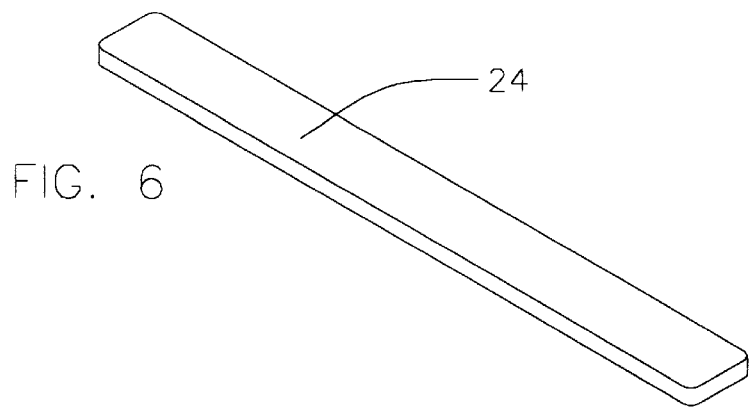
FIG. 6 is a perspective view of a gasket to be used with the motor mount adapters shown in FIGS. 2, 3, and 5.
Figure 7:
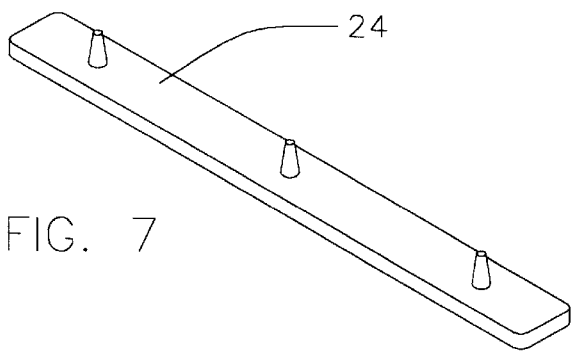
FIG. 7 is a perspective view of a gasket with projections which hold the gasket in place on the gasket mounting surface of the motor mount adapter.
Figure 7A:
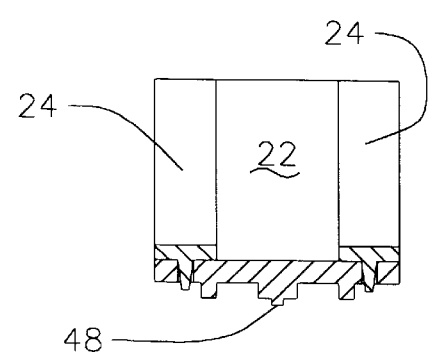
FIG. 7A is an end elevation section view of a motor mount adapter which uses the type of gasket shown in FIG. 7.

FIG. 6 shows a basic embodiment of a gasket 24 to be used with a recessed gasket mounting surface 56 of a motor mount adapter 22. FIGS. 7, 7A, 8, 8A, 9, 9A, 10 and 10A show some alternate gaskets and corresponding motor mount adapters 22.

Figure 8:
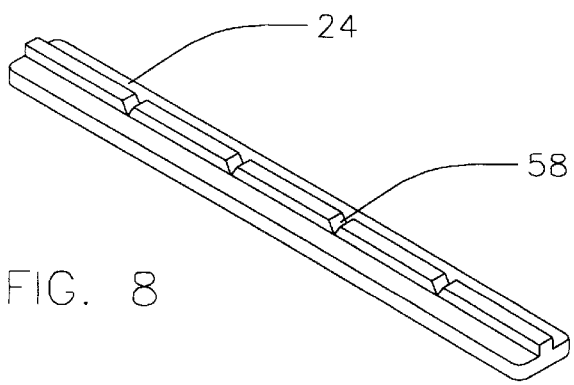
FIG. 8 is a perspective view of a gasket which has a T-shape cross sectional form.
Figure 8A:
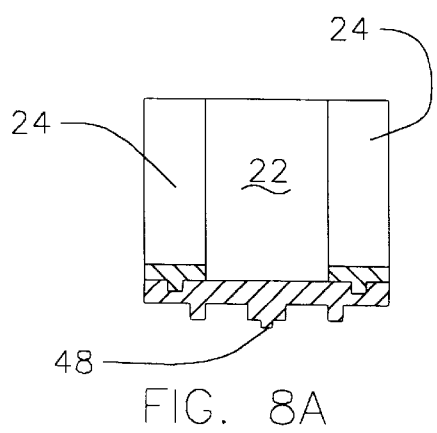
FIG. 8A is an end elevation section view of a motor mount adapter which uses the type of gasket shown in FIG. 8.

The surface of a gasket 24 which resides against the blower motor 36 can have bumps, ribs, or other surface features (not shown) to increase the holding friction of the gasket 24 against the blower motor 30. As shown in FIGS. 8, 9, and 10 a gasket 24 can have a series of notches 58 which allows the gasket to easily conform to the arcuate surface of the motor mount adapter 22. FIGS. 11 and 12 illustrates that a pair of gaskets 24 which fit on the gasket mounting surface 56 of a motor mount adapter 22 can be formed as a single gasket.

FIG. 13 shows a bottom housing member motor mount 36 which has ventilation slots 60. The ventilation slots 60 aid in the dissipation of heat from the blower motor 30. Corresponding ventilation slots 62 can be formed in the motor mount adapter 22, as shown in FIG. 14.

FIG. 1 shows an exploded view of a dual wheel blower assembly. To form a complete blower assembly 20, blower wheels 34 are attached to the shafts 32 of the blower motor 30 by clips 64. Gaskets 24 are placed on the gasket mounting surfaces 56 of the motor mount adapters 22. The raised portion 42 of the bottom motor mount adapter 22 is placed on the motor mount 36 of the bottom housing member 28, taking care to ensure that the bottom motor mount adapter projection 48 is placed in the positioning hole 46 of the bottom housing member motor mount. The blower motor 30 is placed on the gaskets 24 of the bottom motor mount adapter 22. The raised portion 42 of the upper motor mount adapter 20 is placed on the motor mount 36 of the top housing member 26, taking care to ensure that the upper motor mount adapter projection 48 is placed in the positioning hole 46 of the top housing member motor mount. Then, the top housing member 26 is placed on the bottom housing member 28. The top housing member 26 is fastened to the bottom housing member 28 by screws or other fasteners (not shown). When the blower assembly 20 is assembled, the blower motor 30 only touches the gaskets 24. The blower motor 30 does not touch any part of the motor mount adapters 22 nor any part of the blower housing members 26, 28.

The embodiments shown and described above are only exemplary. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A motor mount adapter for a blower housing, said blower housing having motor mounts, comprising:
   a pair of rigid adapter members;
   each of said adapter members having a gasket mounting surface; and
   each of said adapter members configured to couple to a motor mount of the blower housing to hold the adapter member in place against the motor mount during use.

2. The motor mount adapter for a blower housing as defined in claim 1 wherein each of said motor mounts has a positioning hole, and each of said adapter members has a projection from a surface of the adapter member which fits into the positioning hole of a motor mount.

3. The motor mount adapter for a blower housing as defined in claim 1 wherein each of said adapter members has a positioning hole, and each of said motor mounts has a projection from a surface of the motor mount which fits into the positioning hole of an adapter member.

4. The motor mount adapter for a blower housing as defined in claim 1 wherein each adapter member has ventilation slots.

5. A motor mount adapter for a blower comprising in combination:
   a first housing member having a motor mount;
   a second housing member having a motor mount, said second housing member configured to couple to the first housing member to form a blower housing;
   a first adapter member having a gasket mounting surface, said first adapter member configured to couple to the motor mount of said first housing member;
   a second adapter member having a gasket mounting surface, said second adapter member configured to couple to the motor mount of said second housing member;
   gaskets positionable on the gasket mounting surfaces of the first and second adapter members;
   a motor configured to be placed between the gaskets during use; and
   a blower wheel configured to couple to a shaft of the motor.

6. The motor mount adapter for a blower as defined in claim 5 wherein said first and second adapter members have projections which fit into mating surfaces on the motor mounts of the first and second housing members.

7. The motor mount adapter for a blower as defined in claim 5 wherein said motor mounts of the first and second housing members have projections which fit into mating surfaces on said first and second adapter members.

8. The motor mount adapter for a blower as defined in claim 5 wherein said first adapter member is attached to the first housing member motor mount by fasteners placed through the first adapter member, and said second adapter member is attached to the second housing member motor mount by fasteners placed through the second adapter member.

9. The motor mount adapter for a blower as defined in claim 5 wherein the motor mounts of the first and second housing members have ventilation slots, and said first and second adapter members have ventilation slots corresponding to the ventilation slots in the first and second housing members.

10. The motor mount adapter for a blower as defined in claim 5 wherein said gasket mounting surfaces of the first and second adapter members have gasket positioning means for properly positioning the gaskets on the gasket mounting surfaces.

11. The motor mount adapter for a blower as defined in claim 10 wherein said gasket positioning means comprises a recess formed in walls of the first and second adapter members.

12. The motor mount adapter for a blower as defined in claim 10 wherein said gasket positioning means comprises a slot in walls of the first and second adapter members, and wherein said gasket has a projection which fits into said slot.

13. A method of positioning a blower motor in a blower housing wherein the blower motor is of a different size than the blower motor for which the blower housing was designed to hold comprising:
    attaching a blower wheel to a shaft of the blower motor;
    placing a gasket on a gasket mounting surface of a first motor mount adapter;
    placing a gasket on a gasket mounting surface of a second motor mount adapter;
    placing the first motor mount adapter on a motor mount of a first housing member of the blower housing;
    placing the blower motor on the gasket positioned on the gasket mounting surface of the first motor mount adapter;
    placing the second motor mount adapter on a motor mount of a top housing member of the blower housing; and
    attaching the second housing member to the first housing member so that the motor is positioned between the gaskets on the gasket mounting surfaces of the first and second motor mount adapters.

14. The method of using a blower motor in a blower housing as defined in claim 13 further comprising:
    holding the first motor mount adapter against the motor mount of the first housing member by a projection extending from the motor mount adapter into said motor mount.

15. The method of using a blower motor in a blower housing as defined in claim 13 further comprising:
    holding the second motor mount adapter against the motor mount of the second housing member by a projection extending from the motor mount adapter into said motor mount.

16. The method of using a blower motor in a blower housing as defined in claim 13 further comprising:

holding the first motor mount adapter against the motor mount of the first housing member by a projection extending from said motor mount into the first motor mount adapter.

17. The method of using a blower motor in a blower housing as defined in claim 13 further comprising:

holding the second motor mount adapter against the motor mount of the second housing member by a projection extending from said motor mount into the second motor mount adapter.

18. A blower assembled according to the method of claim 13.

* * * * *